Sept. 2, 1941.   L. F. POOCK ET AL   2,254,313
GAUGING APPARATUS
Filed Aug. 10, 1939   2 Sheets-Sheet 1

Inventor
Louis F. Poock
Willis Fay Aller
By Maréchal & Noé
Attorney

Sept. 2, 1941. L. F. POOCK ET AL 2,254,313
GAUGING APPARATUS
Filed Aug. 10, 1939 2 Sheets-Sheet 2

Inventor
Louis F. Poock
Willis Fay Allen
By Marechal & Noe
Attorney

Patented Sept. 2, 1941

2,254,313

UNITED STATES PATENT OFFICE 2,254,313

GAUGING APPARATUS

Louis F. Poock and Willis Fay Aller, Dayton, Ohio, assignors to The Sheffield Corporation, a corporation of Ohio Application August 10, 1939, Serial No. 289,429

9 Claims. (Cl. 33—172)

This invention relates to measuring instruments, and more particularly to measuring instruments for accurately gauging size relationships such as the height or diameter of a measured part with respect to a standard size or dimension.

One object of the invention is the provision of a gauging instrument of this character, having an indicator controlling mechanism controlled by a work-engaging element which is operably mounted for axial adjustment in a movable carrier, movable with the work-engaging element in a gauging operation.

Another object of the invention is the provision of a gauging instrument having an indicator controlling mechanism controlled by a work-engaging plunger which is operably mounted for axial adjustment in a movable carrier which moves with the work-engaging element in a gauging operation, the plunger having an adjusting surface held yieldingly against a portion of the carrier and operable to move the plunger axially in the carrier when the plunger is rotated.

Another object of the invention is the provision of a measuring instrument having an arm movable in accordance with the size of a measured part and controlling a plurality of electric circuits through switch means which maintain circuits through a pair of indicator lamps in closed condition when the arm is in a normal mid-position so that both of the lamps are energized, the arm being operable to selectively open one or the other of the circuits so that only one of the lamps will be energized when the part measured is above or below a predetermined size.

Another object of the invention is the provision of a measuring gauge including a pair of indicator lamps of different colors, one of which is energized to indicate an oversize dimension of the work and the other to show an undersize condition of the work, and both lamps being energized to show a color different from that of either of the individual lamps when the size of the work is within a required limit.

Other objects and advantages of the invention will be apparent from the following description, the appended claims and the accompanying drawings.

In the drawings, in which the same reference characters have been applied to like parts in the several views.

Figure 2:
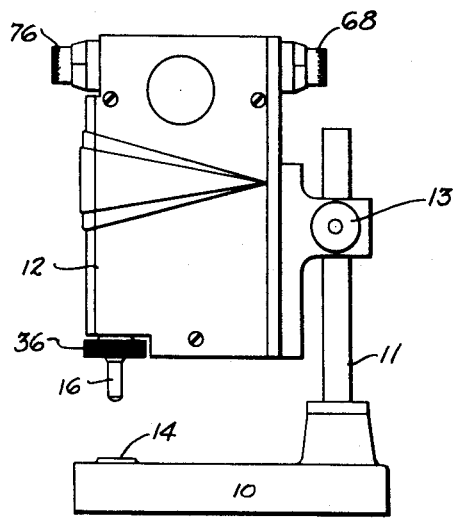
Fig. 2 is a side elevation of the gauge.
Figure 1:
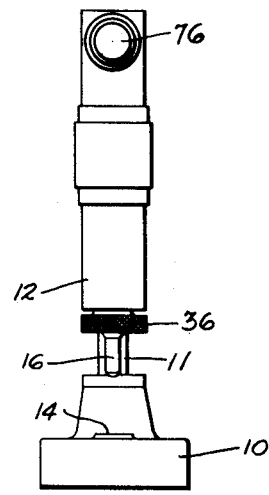
Fig. 1 is a front elevation of a gauge embodying the present invention.

The gauge illustrated in the drawings to show the preferred embodiment of the invention, comprises a suitable supporting base 10 having a standard 11 which adjustably carries a housing 12, the height of which may be readily changed as by turning a hand wheel 13 carrying a suitable pinion which operates along rack teeth on a side of the standard 11 in any suitable or conventional manner, suitable locking means being provided to secure the housing at a desired height above the work-supporting anvil 14 on the base. With the housing 12 properly positioned a workpiece arranged on the anvil 14 may be contacted by the work-engaging element 16 which is mounted for movement within the housing and which controls the indicating mechanism by which the operator determines whether the workpiece is of the required size, as by comparing the indication produced with that obtained when a standard part is in place on the anvil.

The housing 12 carries a fixed metal block 18, held in place on the rear wall 19 of the housing by means of suitable attaching screws 20. Adjacent the stationary block 18 is a movable block 21 forming a carrier for the work-engaging element 16, and movable with the work-engaging element in a gauging operation. This movable carrier is supported from the stationary block 18 by means of a pair of parallel flexible spring blades 22 and 23. One end of each of these blades is secured rigidly by small clamp blocks 24 to the stationary block 18 and the other end of each is secured by similar clamp blocks to the carrier 21, thus mounting the carried for yielding movement in a substantially straight line coinciding with the axis of the work-engaging element 16. A spring 25 fastened as by studs 26 and 27 on the carrier and the fixed block acts to yieldingly hold the carrier 21 downwardly to maintain the work-engaging element in a lowered position. Fingers 28 and 29 fixed respectively to the stationary block and the movable carrier serve to limit their relative movement.

Figures 4, 5, 6:
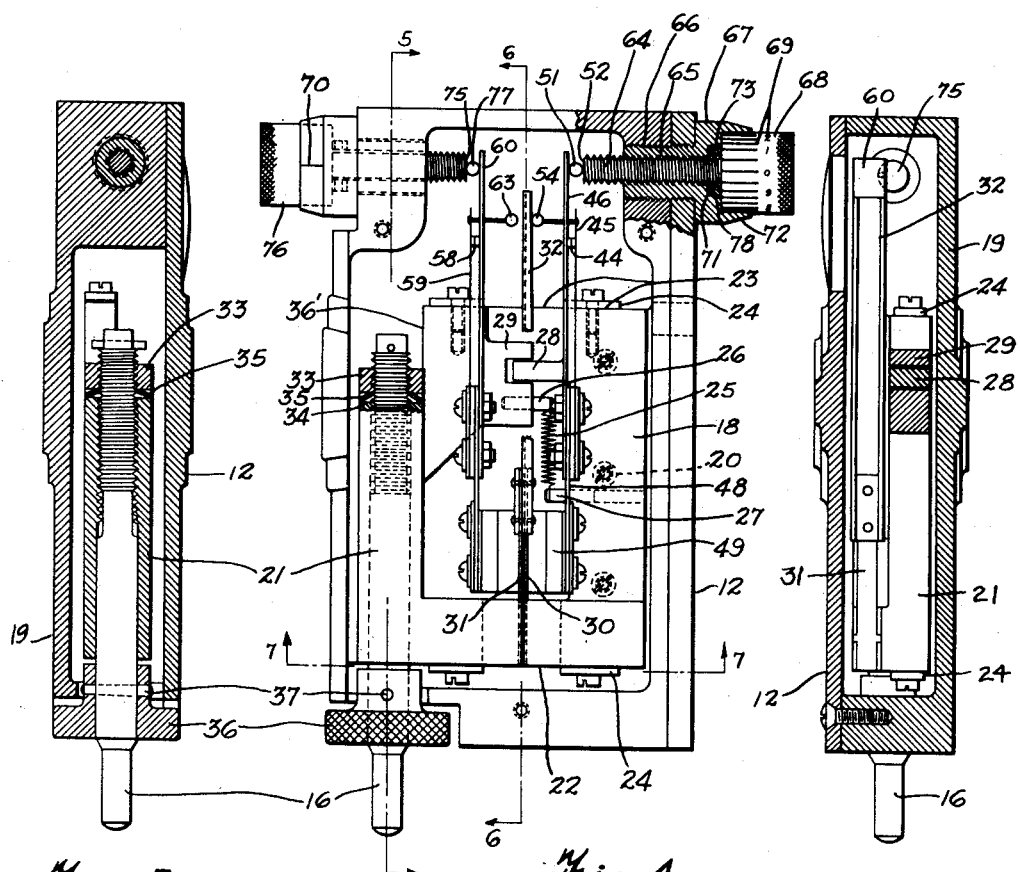
Fig. 4 is a side elevation of the gauge housing, with the side cover plate removed and showing a portion of the structure in section.
Fig. 5 is a section on the line 5—5 of Fig. 4.
Fig. 6 is a section on the line 6—6 of Fig. 4.
Figure 7:
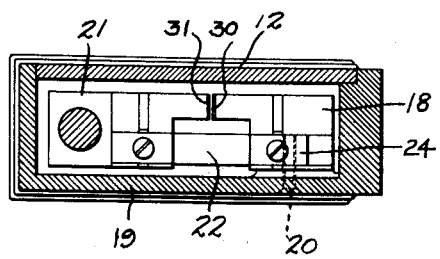
Fig. 7 is a horizontal section on the line 7—7 of Fig. 4.

Secured at their lower ends to closely adjacent portions of the fixed block and movable carrier are two spring blades 30 and 31, which are fastened securely at their upper portions to a movable arm 32, which is thus carried for swinging movement about a theoretical center near the lower ends of the spring blades 30 and 31. In its normal position the arm 32 extends substantially vertically as shown in Fig. 4, when a workpiece of the proper size is engaged by the element 16.

The work-engaging element 16 is provided with means whereby it can be readily adjusted axially in the carrier 21 and be yieldingly held in any adjusted position under a predetermined tension. As shown the upper end of element 16 is threaded in the carrier and in threaded engagement with a nut 33 which is spaced a small distance above the surface 34 of the carrier. One side of the nut contacts the side surfaces 36' of the carrier 21 so the nut cannot rotate. Between the nut and the carrier is a dished washer 35 which is held under compression by the nut so as to exert a force on element 16 upwardly in an axial direction. As the threads on element 16 maintain a constant spacing between the nut and the carrier surface 34 during rotational adjustment of the element 16 the yielding force on that element tending to hold it in any position of adjustment is constant. The element 16 can be readily ro-rotated at any time by the operator by means of a hand wheel 36 which is secured on the element by a pin 37. It will thus be seen that the location of the element in the carrier may be very accurately controlled, merely by rotating the element in the carrier, to so adjust the parts that the arm 32 will assume a normal vertical position when the element 16 engages a piece of the required size dimension. In a gaging operation the work-engaging element 16 and the carrier 21 move together as one part with no possibility of lost motion, and since the carrier 21 is carried by flexible spring blades as previously described it will be seen that there is no possibility of lost motion being present anywhere between the part of the gage which contacts with the work and the movable arm 32 which is responsive to the size of the work.

Figure 3:
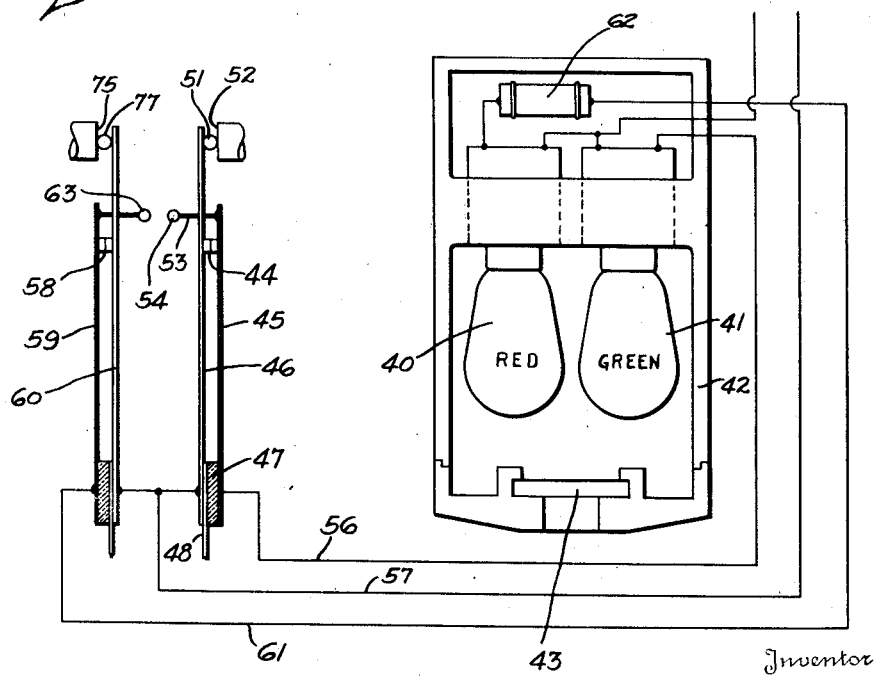
Fig. 3 is a view of the indicating lamps showing the electrical connections diagrammatically.

The movement of the arm 32 controls the energization of indicator lamps, in accordance with the construction shown in Fig. 3, there being two lamps 40 and 41 contained in a common casing 42 which is provided with an opalescent glass 43 through which the light from the lamps is apparent. The two lamps 40 and 41 are of different colors, the lamps 40 and 41 being preferably red and green respectively so that either one of those two colors will be apparent on the opalescent glass 43 when they are individually energized. However when both lamps are energized at the same time, the glass 43 shows a color different from that of either of the lamps. With a red and a green lamp, both energized simultaneously, an amber color will be apparent on the glass 43. A suitable cover plate is provided for the casing, but is omitted in Fig. 3 for purposes of illustration.

In the central position of the arm 32, both of the lamps will be energized, and an amber color produced on the screen 43 to show that the part gauged is within the acceptable limits of the required size range. The means for controlling the energization of the lamps, as will be seen from Fig. 4, comprises a switch 44 including a movable contact provided on a flexible metal strip 45 and a normally stationary and comparatively rigid arm 46, the lower ends of these parts 45 and 46 being secured to an insulating block 47 which is mounted on a flexible spring strip 48, carried at its lower end on a stationary support block 49. The latter is secured to the fixed block 18. The spring strip 48 normally tends to yieldingly urge both arm 46 and strip 45 towards the right as viewed in Fig. 4. Fixed to the upper end of the arm 46 is a contact ball 51, which bears against a stop surface 52. The latter determines the position of the arm 46. Fixed to the flexible strip 45 is a finger 53 passing through an opening in the arm 46 and having a ball 54 preferably of insulation material, which may be engaged by the arm 32 when that arm moves towards the right from its normal position or range of positioning. This presses on the ball 54 and pushes the strip 45 outwardly against the yielding pressure it exerts, and thus opens the switch 44. In the normal position of the arm 32 there is a suitable small clearance between the arm 32 and the ball 54, and the switch 44 is therefore normally held closed, thus energizing the lamp 41 through wires 56 and 57.

At the other side of the arm 32 is a similar switch 58, arranged on a flexible metal strip 59, and a spring supported rigid arm 60, switch 58 being normally closed to energize the lamp 40 through the wires 57 and 61. A controllable resistance 62 is preferably included in the circuit of one of the lamps such as lamp 40 so that the relative amount of light obtained from the two lamps can be controlled to give a desired amber color when both lamps are simultaneously energized.

With a workpiece of the desired size on the anvil 14 and engaged by the element 16, the element 16 having been adjusted so that arm 32 extends substantially vertically and preferably midway btween the two balls 54 and 63, both lamps will be simultaneously energized. In testing a workpiece substituted for the piece of standard size, both lamps will be simultaneously energized if the workpiece is within a certain range of size determined by the spacing between balls 54 and 63 and arm 32. However if the work is somewhat oversize, the carrier 21 will be moved upwardly far enough to swing the arm 32 to the right and open the switch 44, deenergizing the green light and showing only red on the glass 43. If the work is undersize, the other switch 58 will be opened, and only the green lamp will be energized.

The distance between the arm 32 in its centered position and either of the balls 54 and 63 may be adjusted very accurately so that either lamp may be deenergized at any desired position of the arm 32, thus providing an adjustment of the instrument to take care of a very small range of acceptable size dimensions up to a very large range. The stop surface 52 is thus adapted to be readily moved transversely of arm 32, and as shown the stop surface 52 is provided transversely at the end of a screw 64 which is threaded in a sleeve 65 so that it may be adjusted axially by rotational movements of the screw. The sleeve 65 is fixed in the upper portion of the housing 12 preferably by means of screw threads 66, and has a laterally projecting ring portion 67. The ring portion 67 receives the inner part of a hand knob 68 which is secured on the outer end of the screw 64 and forms a means by which the screw can be conveniently rotated by the operator. Graduation marks and indications 69 provided on the knob 68 cooperate with a fixed index 70 on the part 67 so that the operator can see how much endwise adjustment he gives to the screw 64 as he positions the screw.

The screw is yieldingly held in any position of adjustment by a constant spring force which exerts a constant friction against turning movement although that friction can be readily overcome by the operator as he manipulates the knob 68. This yielding force is provided by a spring washer 78 which presses against the surface 71 on part 67, and bears its other end against a nut 72 which is threaded on the screw 64, and which is kept from rotating by a socket 73 in part 67, the socket 73 having the same shape as the nut. The washer 78 is held constantly under compression, the initial compression force being applied by pushing it towards the left as viewed in Fig. 4 as it initially engages the threads of sleeve 65, with the nut 72 the required distance from the end of the screw so that a desired compression force will be applied to the spring washer. The spacing between the nut 72 and the surface 71 will be constant in all positions of adjustment of the screw 64.

The screw 64 may thus be moved endwise through a considerable range of movement and the calibration marks on the knob show exactly how much adjustment movement is given to the stop surface 52 so that the operator can adjust the parts to have the contact at 44 just about to be opened when the arm 32 is in normal position and then move the screw to provide a predetermined known amount of tolerance which a gauged member may have before the switch is opened by arm 32 in a gauging operation. This permits a very fine adjustment and gives an accurate control to the amount of oversize which the workpiece may have before the arm 32 will deenergize the green light 41.

A similar mechanism including stop surface 75 and a similar adjustment knob 76 is provided for the ball 77 which is fixed on the upper end of the arm 60, so that the amount of undersize from an exact size relationship may be exactly determined.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a gauge, a stationary block, a support in which said block is fixed, a movable block, parallel spring blades fixed to said blocks and supporting the movable block for rectilinear movement, a pair of closely spaced spring strips one fixed to each of said blocks, an arm carried by both of said strips and operable in accordance with the movements of the movable block, a work-engaging element adjustably threaded in said movable block, a stop threaded on said element and held against rotation by said movable block, spring means engaging said stop and said movable block and tending to yieldingly urge said element in one direction in said movable block, the threads between the stop and the element having the same lead as the threads between the element and the movable block to maintain a constant axial pressure on the element in its various positions of adjustment in the movable block.

2. A gauge comprising a work-engaging element adapted to contact and be moved by the work, a support, means mounting said element on said support for reciprocatory movement towards and from the work position, a movable switch-controlling arm, means operably connecting said arm to said element, switch means operated by said arm and including an adjustable contact member, a rotatable adjusting stud for adjusting said contact member, means providing a threaded connection between said stud and said support, and means for maintaining a constant predetermined pressure on said stud in the direction of the stud axis in its various positions of adjustment.

3. A gauge comprising a work-engaging element adapted to contact and be moved by the work, a support, means mounting said element on said support for reciprocatory movement towards and from the work position, a movable switch-controlling arm, means operably connecting said arm to said element, switch means operated by said arm and including an adjustable contact member, a rotatable adjusting stud for adjusting said contact member, means providing a threaded connection between said stud and said support, and means for maintaining a constant predetermined pressure on said stud in the direction of the stud axis and comprising a nut threaded on said stud, means on said support preventing rotation of said nut, and yielding means interposed between said nut and said support and maintaining a constant axial pressure on said nut to provide a constant endwise force on said stud.

4. A gauge comprising a work-engaging element, a movable arm, means operated by said element controlling the position of said arm, said arm having a normal position for work of a desired size and movable to one side or the other from such normal position depending on whether the work being gauged is too large or too small, a first electric circuit including an electrical responsive device, switch means operated by said arm when displaced to one side of its normal position for opening said circuit, a second circuit including a second electrical responsive device, switch means operated by said arm when displaced to the other side of its normal position for opening said second circuit, said circuits being normally closed and both electrical responsive devices energized when the arm is in its normal position, an adjusting device including a rotatable control member for said last-named means for adjusting the range of movement permitted the arm before it opens said second circuit, and indicating means associated with said adjusting device for indicating the range of movement of said arm from a predetermined position before it opens said second circuit.

5. A gauge comprising a work-engaging element, a movable arm, means operated by said element controlling the position of said arm, said arm having a normal position for work of a desired size and movable to one side or the other from such normal position depending on whether the work being gauged is too large or too small, a first electric circuit including a colored lamp, a switch mechanically operated by said arm when displaced to one side of its normal position and in series with said lamp for controlling said circuit, a second circuit including a second lamp of a different color, a second switch mechanically operated by said arm when displaced to another position and in series with said second lamp for controlling said second circuit, said circuits being normally closed and both lamps energized, and a translucent glass through which the different colors of the lamps are visible when the lamps are energized individually and adapted to show a third color different from the two colors of the individual lamps when the lamps are energized at the same time.

6. A gauge comprising a work-engaging element, a movable arm, means operated by said element controlling the position of said arm, said arm having a normal position for work of a desired size and movable to one side or the other from such normal position depending on whether the work being gauged is too large or too small, a first electric circuit including a colored lamp, means operated by said arm when displaced to one side of its normal position for opening said circuit, a second circuit including a lamp of a different color, means operated by said arm when displaced to the other side of its normal position for opening said second circuit, said circuits being normally closed and both lamps energized when the arm is in its normal position, and a translucent glass in front of said lamps and through which the different colors of the lamps are visible when the lamps are energized individually and adapted to show a third color different from the two colors of the individual lamps when the lamps are energized at the same time.

7. A gauge comprising a work-engaging element, a movable carrier for said element, spring means supporting said carrier for yielding movement, a support for said spring means, means for adjusting said element in said carrier, an arm having an operable connection to said carrier for movement thereby and having a normal position for work of a desired size and movable to one side or the other from such normal position depending on whether the work being gauged is too large or too small, a first electric circuit including a lamp, switch means operated directly by said arm when displaced to one side of its normal position and in series with said lamp for opening said circuit, a second circuit including a lamp, switch means operated directly by said arm when displaced to the other side of its normal position for opening said second circuit, said circuits and switch means being normally closed and both lamps energized when the arm is in its normal position.

8. A gauge comprising a work-engaging element adapted for positioning by the work, a carrier guiding said element for rotatable and axial movement therein and movable in fixed relation with the element in a gauging operation, means on said element for axially adjusting the element with respect to the carrier by rotation of the element, a support, means movably mounting said carrier on said support for movement of the carrier in the direction in which the element is guided in the carrier, an arm operable by said carrier, switch means on each side of a normal position of said arm and adapted to be selectively operated when the arm is displaced from its normal position, a rotatable adjusting member engaging each switch means and operable to adjust its respective switch to vary its time of operation with respect to the arm location, and indicating means on each adjusting member showing the amount of tolerance from a normal measurement which a gauged member may have before the switch means are operated by said arm.

9. In a gauge, a support, a movable member, means movably supporting said member on said support, gauging means operated by said member, a work-engaging element threaded in said member, a stop threaded on said element and held against rotation by said member, spring means engaging said stop and said movable member and tending to yieldingly urge said element in one direction in said member, the threads between the stop and the element having the same lead as the threads between the element and said member to maintain a constant axial pressure on the element in its various positions of adjustment in the movable member.

LOUIS F. POOCK.
WILLIS FAY ALLER.